United States Patent
Cassway et al.

(10) Patent No.: US 7,819,619 B2
(45) Date of Patent: Oct. 26, 2010

(54) RETRACTABLE RAMP SYSTEM

(76) Inventors: Rustin Arthur Cassway, 60 Cunningham La., Cherry Hill, NJ (US) 08003; Francis Joseph Fisher, 5 Saddelbury Ct., Southampton, NJ (US) 08088; David John Fisher, 12 Chillemi Ct., Berlin, NJ (US) 08009; Albert Stephen Perry, 7032 Keystone St., Philadelphia, PA (US) 19135

( * ) Notice: Subject to any disclaimer, the term of this patent is extended or adjusted under 35 U.S.C. 154(b) by 164 days.

(21) Appl. No.: 12/291,578

(22) Filed: Nov. 12, 2008

(65) Prior Publication Data

US 2010/0115714 A1    May 13, 2010

(51) Int. Cl.
*B60P 1/43* (2006.01)
(52) U.S. Cl. .................. 414/558; 414/540; 414/556; 280/149.2; 14/69.5
(58) Field of Classification Search ............ 414/540, 414/556, 557, 558; 296/50; 280/149.2; 14/69.5
See application file for complete search history.

(56) References Cited

U.S. PATENT DOCUMENTS

| | | | | |
|---|---|---|---|---|
| 3,511,393 A * | 5/1970 | Abromavage et al. | ........ | 414/537 |
| 4,198,187 A * | 4/1980 | Mountz | ............... | 414/537 |
| 4,929,018 A * | 5/1990 | Carty | ..................... | 296/204 |
| 5,395,201 A * | 3/1995 | Yamashita et al. | .......... | 414/467 |
| 5,897,285 A * | 4/1999 | Wanderscheid et al. | ..... | 414/537 |
| 6,244,608 B1 * | 6/2001 | Hess | ................. | 280/149.2 |
| 7,025,398 B1 * | 4/2006 | Montagna et al. | ........ | 296/26.01 |
| 7,063,494 B2 * | 6/2006 | Smith, Jr. | .................... | 414/471 |
| 7,445,220 B2 * | 11/2008 | von Mayenburg et al. | .................... | 280/124.116 |
| 7,533,923 B1 * | 5/2009 | Caldwell | ..................... | 296/61 |
| 7,648,324 B1 * | 1/2010 | Jensen | ......................... | 414/549 |
| 7,708,294 B2 * | 5/2010 | Demick | ................... | 280/164.1 |
| 2001/0048872 A1 * | 12/2001 | Sardonico | .................... | 414/556 |

* cited by examiner

*Primary Examiner*—Michael S Lowe
(74) *Attorney, Agent, or Firm*—Stuart M. Goldstein

(57) ABSTRACT

A retractable ramp system mounts a slideable ramp between lateral rail members which extend the length of a truck chassis and a container mounted thereon. The ramp is slideably suspended from a guide rail running parallel to the lateral rail members by means of a carriage component, itself slideably mounted within the guide rail. It is readily and easily extended and retracted by one person. When positioned directly on a truck chassis, the rail system is located above the hydraulic, electrical, and other mechanical systems positioned within the well of the truck chassis, such that the ramp is slideably moveable over these system components without interfering with them or any other part of the truck chassis. The ramp system is conveniently used for loading and off-loading containers which rest on the truck chassis or which are elevated above the chassis.

26 Claims, 11 Drawing Sheets

RETRACTABLE RAMP SYSTEM

BACKGROUND OF THE INVENTION

This invention relates to the field of transportable cargo carrying containers and is an advancement in promoting the expeditious and efficient process of loading and unloading containers.

Cargo carrying container loading operations are often performed while a container remains positioned on the container carrying truck chassis itself. Other containers incorporate integral leg members which permit the container to be free-standing from the truck chassis or to be positioned adjacent to loading docks. Such containers and the lifter systems which raise and lower the containers are exemplified by the components and systems manufactured by Demountable Concepts Inc.™ and are shown at www.demount.com.

Whether located on or elevated above a truck chassis, cargo containers are positioned above the ground or loading dock surface during loading and unloading operations. It is thus necessary and desirable to position a ramp for use with the container. However, in most cases, ramps must be retrieved from alternate locations or from within the container itself, thus taking up valuable cargo space. In some cases, ramps may not be available. The loading and off-loading process is seriously adversely effected as a result.

This problem has been addressed in the past by attempts to incorporate ramps within the truck chassis of the vehicles. Nonetheless, such attempts have not been practical or successful. Prior proposals would add unwanted weight to the vehicle. Other truck chassis/ramp designs consist of many moveable parts which are susceptible to breakage. Many such systems do not operate smoothly and efficiently and are difficult, if not impossible to retract and replace by a single individual. And no prior retractable type ramps have been developed for use with the truck mounted container lifter systems which have increased in popularity in recent years.

SUMMARY OF THE INVENTION

It is thus the object of the present invention to provide a retractable ramp system which overcomes the limitations and disadvantages of prior systems.

It is an object of the present invention to provide a retractable ramp system consisting of an efficient, effective, and available means to extend a ramp located aft of a truck chassis or a container for immediate use in loading or off-loading a container.

It is another object of the present invention to provide a retractable ramp system which is easily retracted and stored when not in use.

It is a further object of the present invention to provide a retractable ramp system which incorporates an easily moveable, sliding ramp within a compact unit, capable of being readily attached and detached from a truck chassis or a container.

It is still another object of the present invention to provide a retractable ramp system which allows a single person to easily extend and retract a ramp from a truck chassis or a container.

It is another object of the present invention to provide a retractable ramp system which is economic to manufacture and has few moving parts which are subject to breakage.

These and other objects are accomplished by the present invention, a retractable ramp system which mounts a slideable ramp between lateral rail members which extend the length of a truck chassis and a container mounted thereon. The ramp is slideably suspended from a guide rail running parallel to the lateral rail members by means of a carriage component, itself slideably mounted within the guide rail. It is readily and easily extended and retracted by one person. When positioned directly on a truck chassis, the rail system is located above the hydraulic, electrical, and other mechanical systems positioned within the well of the truck chassis, such that the ramp is slideably moveable over these system components without interfering with them or any other part of the truck chassis. The ramp system is conveniently used for loading and off-loading containers which rest on the truck chassis or which are elevated above the chassis.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
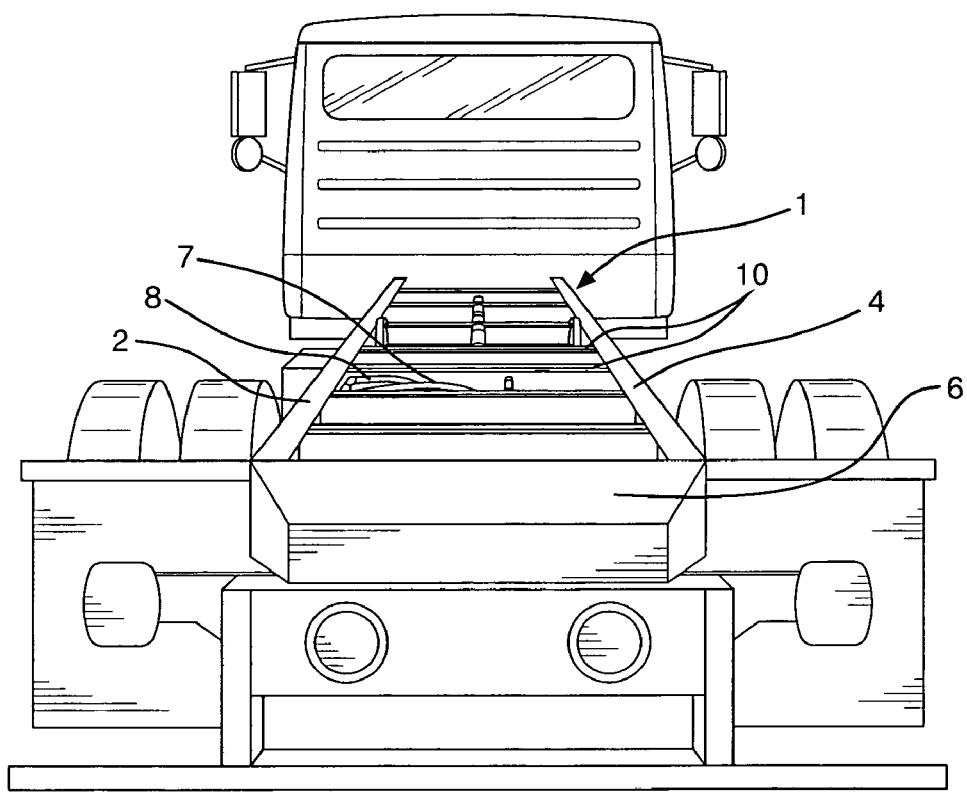
FIG. 1 is a rear view of a prior art truck and its truck chassis in which an outside ramp must be used for container loading and unloading operations.

A typical truck chassis configuration is shown in FIG. 1. This truck chassis 1 comprises lateral rails 2 and 4 and transverse rear end member 6, encompassing an open well 7 into which the components of hydraulic, electrical, and mechanical systems 8 of the truck chassis are positioned. Cross brace members 10 are provided to lend added strength to truck chassis 1, especially for placement of containers thereon. Such common truck chassis configurations clearly serve to protect operating systems, but the fully enclosed well 7 design, comprising rear end member 6, prevents the use of a self-contained ramp within the truck chassis itself.

Ramp system 20 of the present invention addresses this deficiency. Ramp system 20, in fact, employs many of the components of current container lifter systems, but constitutes a significant advancement and improvement to these systems, as will be described hereinafter.

Truck chassis 22 routinely takes the form of framework which supports a cargo carrying container. Ramp system 20 is designed to be supported directly on truck chassis 22 and to be used in this configuration. However, ramp system 20 is separable from truck chassis 22, such that it is also vertically moveable to an elevated position over the truck chassis for use with an elevated container.

Figure 7:
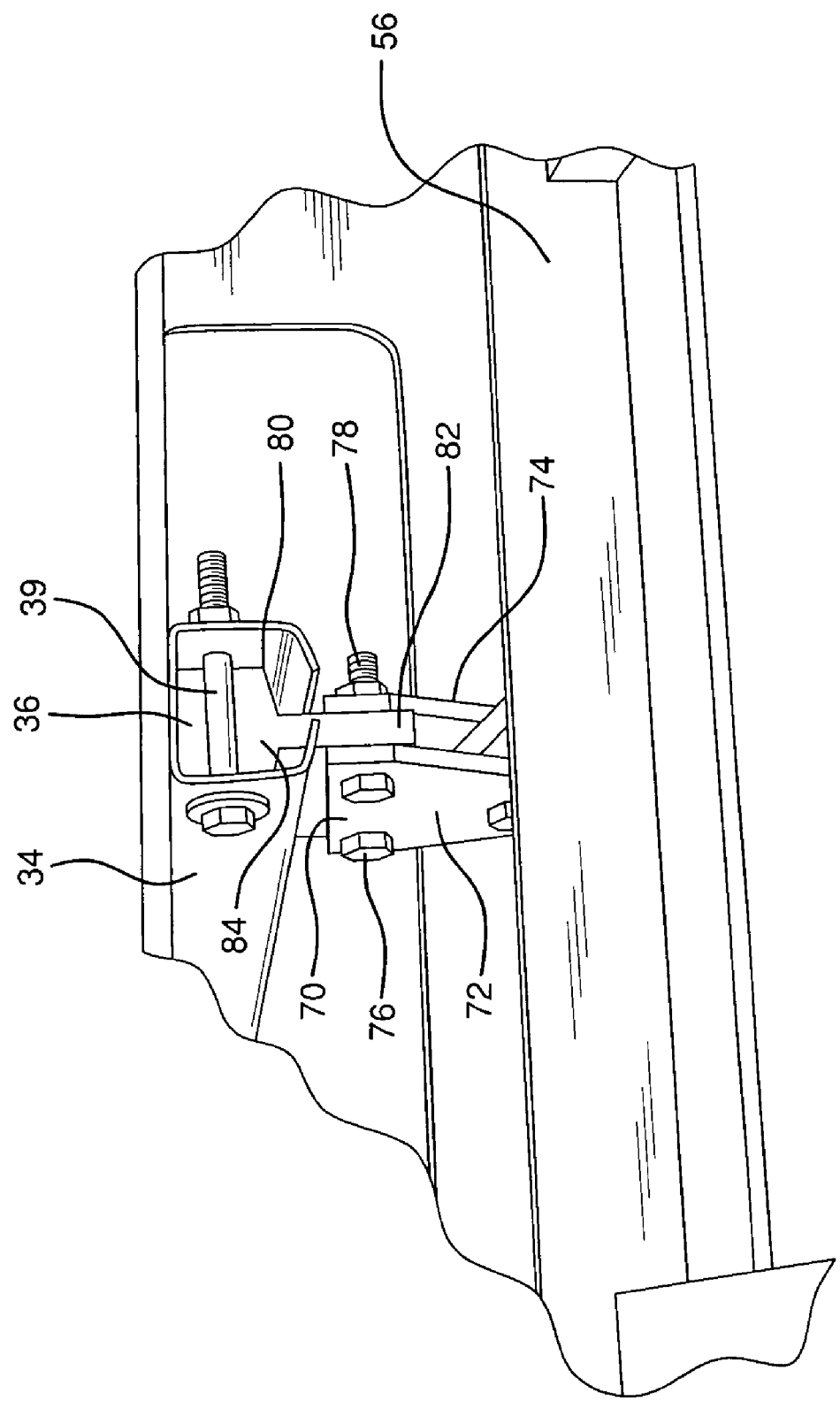
FIG. 7 is a partial isometric view of the carriage component of the present invention.

Ramp system 20 comprises rail members 24 and 26 running laterally along and extending substantially the length of truck chassis 22. Rail members 24 and 26 are above and encompass well 27, in which system components 29 are located. Cross brace beams 28, 30, and 32 are secured to and extend between rail members 24 and 26, above well 27. Guide rail 34 runs parallel to and between rail members 24 and 26. Guide rail 34 is suspended and maintained above open well 27 by attachment to cross brace beams 28, 30, and 32. The outboard end of guard rail 34, near the rear of truck chassis 22, is attached to cross brace beam 28 and the inboard end terminates at forward truck chassis bulkhead 38. Stop bolt 39 is located through the outboard end of guide rail 34 (see FIG. 7). Through channel 36 extends the full length of guide rail 34.

Figure 4:
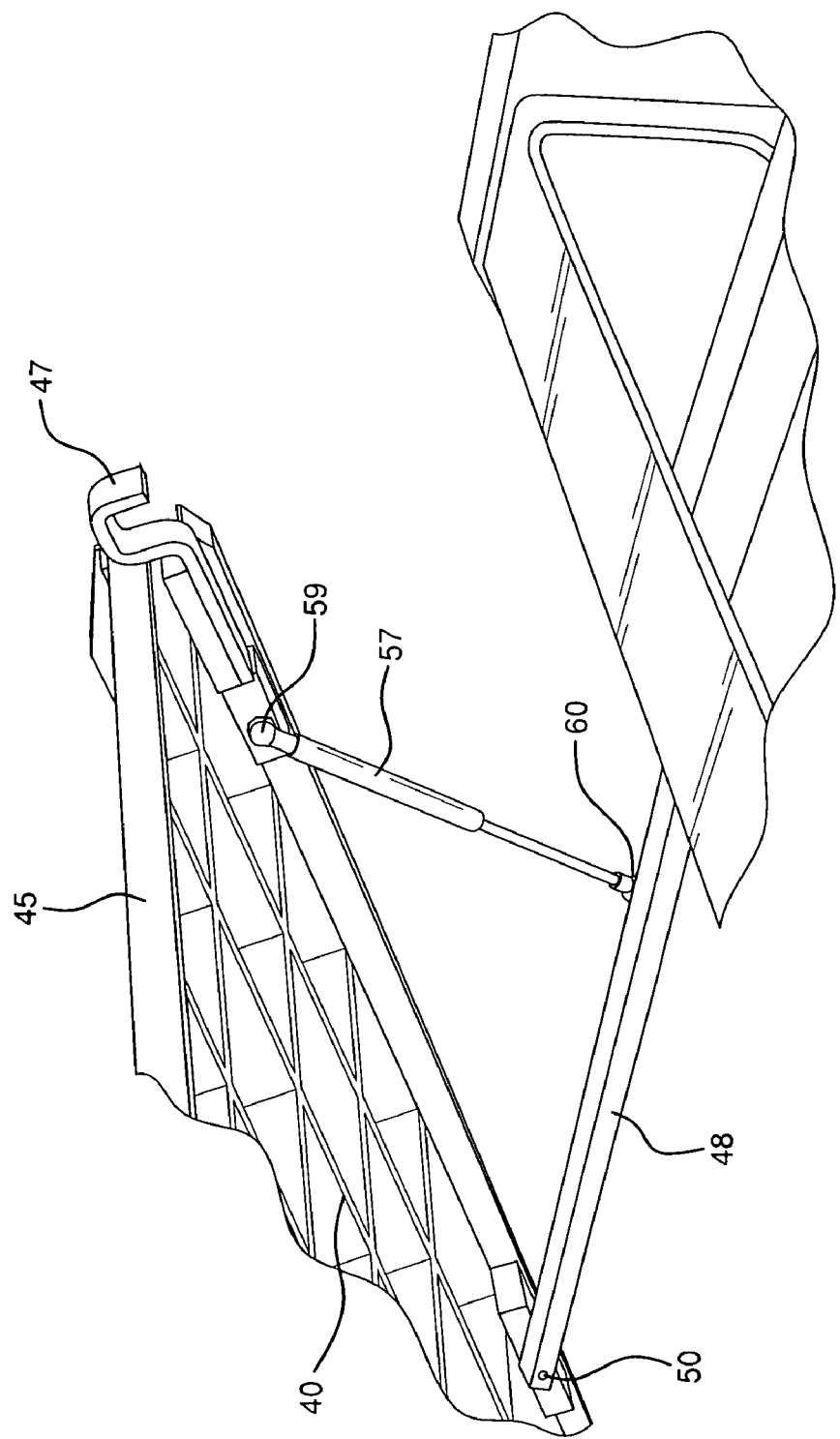
FIG. 4 is a partial isometric view of the mid-section ramp connection of the system of the present invention.
Figure 5:
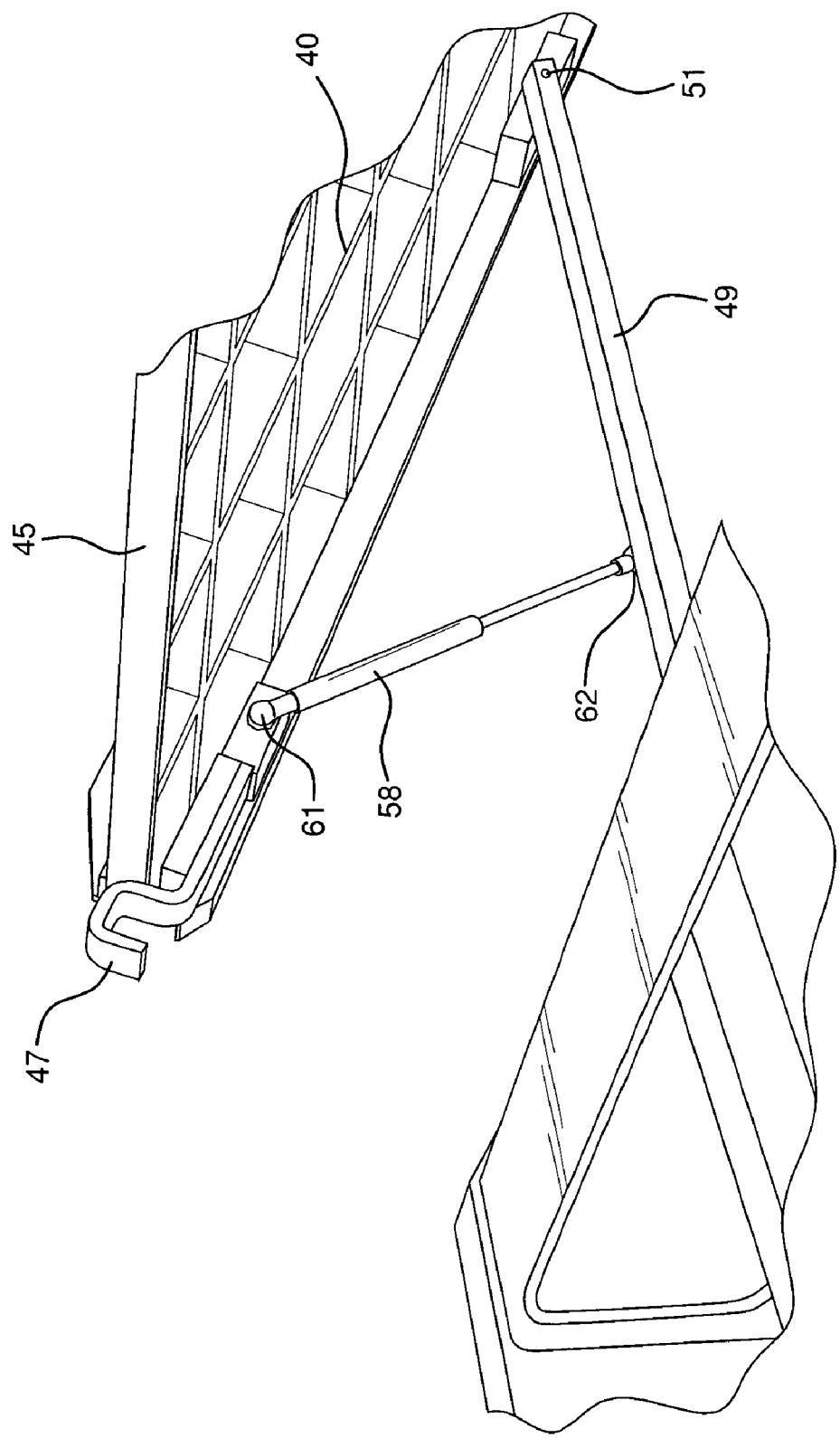
FIG. 5 is a partial isometric view of the opposite mid-section ramp connection of the system of the present invention.

Elongated ramp 40 has lower end 42 with loading pad 44, and upper end 45 where laterally positioned hooks 46 and 47 are located. Lower ramp bars 48 and 49 are pivotably connected at their lower ends to the underside of ramp 40. FIG. 4 shows lower ramp bar 48 connected in this manner by bolt or equivalent means 50. Lower ramp bar 49 is similarly connected to the underside of ramp 40 by bolt or equivalent means 51, as shown in FIG. 5. Lower ramp bars 48 and 49 are pivotably connected at their upper ends by bolts or equivalent means 52 and 53 to upper ramp bar members 54 and 55, which are, themselves permanently connected to ramp cross member 56. Hydraulic lift supports 57 and 58, shown in FIGS. 4 and 5, are pivotably connected to ramp 40 and the midsections of lower ramp bars 48 and 49 are pivotably connected at their ends, 59 and 60, and 61 and 62.

Figure 8:
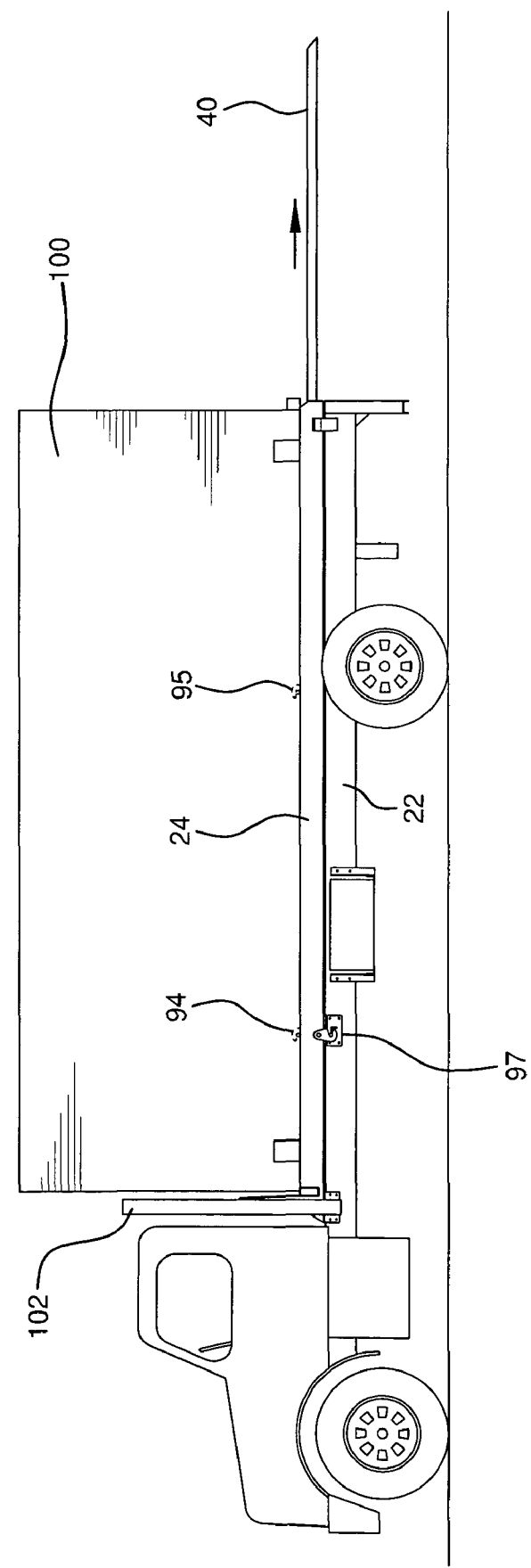
FIG. 8 is an elevation view showing the ramp of the present invention being slid out for loading or unloading a container mounted on a truck chassis.
Figure 9:
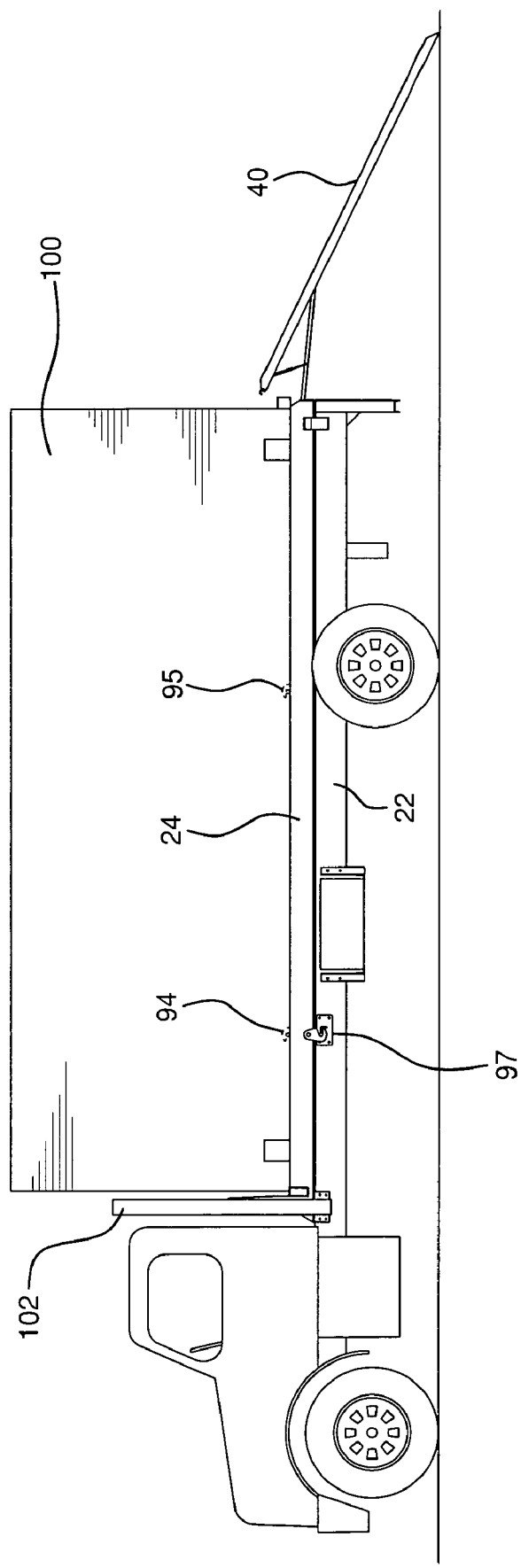
FIG. 9 is an elevation view of the ramp of the present invention prior to attachment onto a container mounted on a truck chassis.
Figure 10:
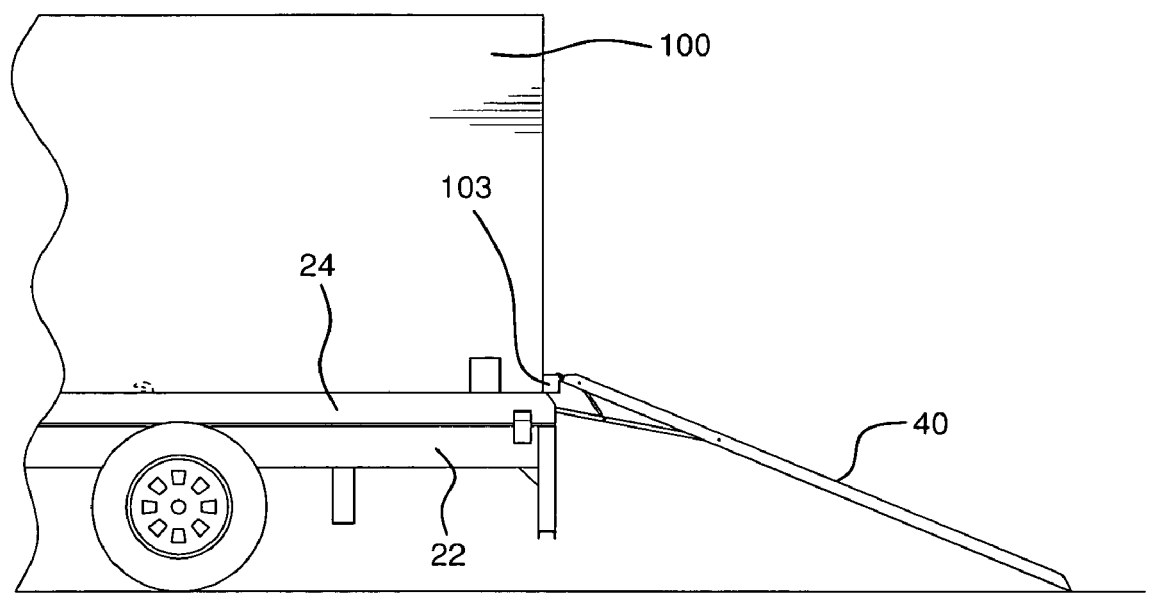
FIG. 10 is a partial elevation view of the ramp of the present invention secured to a container for loading and off-loading operations.

Thus, by this configuration ramp 40 is directly pivotable and rotatable about three pairs of connections: 50/51, 52/53, and 59/61, and is indirectly rotatable or pivotable about connections 60/62, as the ramp, after it is slid out from its horizontal storage mode, shown in FIG. 8, is converted to its use mode, shown in FIGS. 9 and 10, as is described in further detail hereinafter.

Ramp carriage component 70 comprises dual plates 72 and 74 secured to ramp cross member 56. Bolts 76 and 78 secure dual plates 72 and 74 to upstanding ramp support element 80. Ramp support element 80 comprises lower section 82 to which dual plates 72 and 74 are secured, and upper section 84 configured to be slideably mounted within and through the complete length of channel 36 of guide rail 34.

Figure 2:
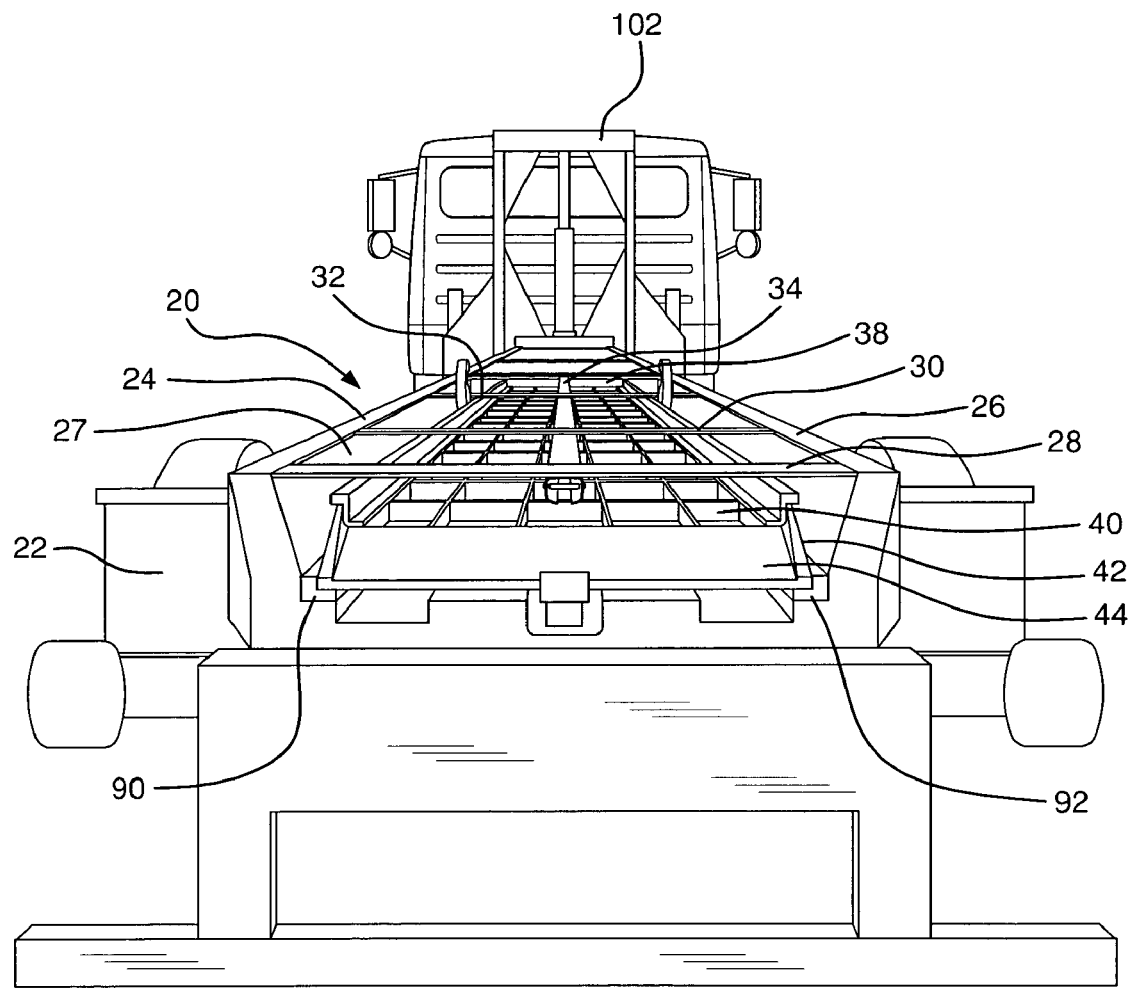
FIG. 2 is a rear view of the ramp system of the present invention mounted on a truck chassis.
Figure 6:
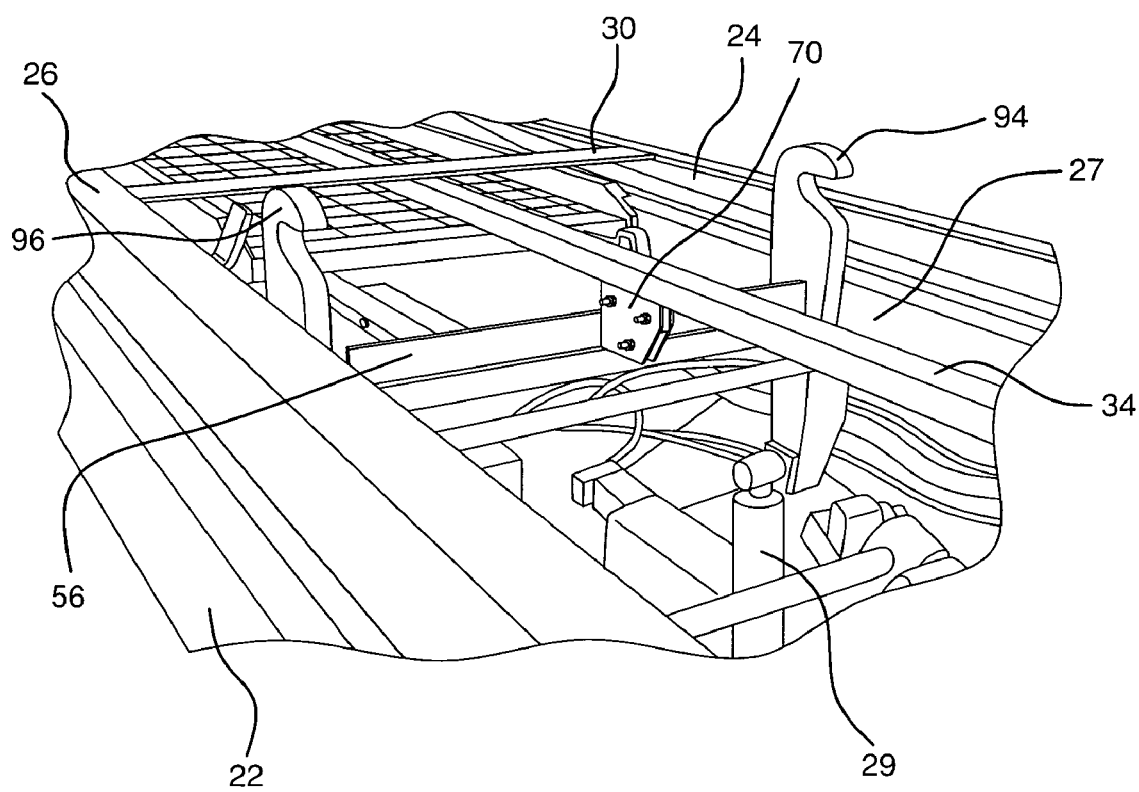
FIG. 6 is a partial isometric view of the ramp of the system of the present invention, positioned horizontally over a truck chassis.

When ramp 40 is in its storage position, shown in FIG. 2, or when it is being slid to an extended or retracted position, shown in FIG. 6, carriage component 70, within channel 36 of guide rail 34, serves to suspend the ramp above well 27 and system components 29 within truck chassis 22. In its fully stowed position, lower end 42 of ramp 40, with its loading platform 44, rests on pads 90 and 92 at the back end of rail members 24 and 26.

Ramp system 20, comprising rail members 24 and 26, ramp 40, and the various other operable components herein described, can be used in conjunction with the truck chassis of most truck/container transport systems, where the container rests on the chassis and quick and easy access to a ramp is desired. However, the subject ramp system has particular utility with container lifter and support systems into which it is incorporated; that is, systems which employ transportable containers equipped with support legs which can be detached from and elevated above truck chassis for loading and unloading. The use of the present invention on these type systems, as well as standard truck container combinations, is shown with reference to FIGS. 8-11.

FIG. 8 shows container 100 loaded on the rail members of ramp system 20. Rail member 24 is seen in FIG. 8. The rail members are normally placed in position, resting on truck chassis 22. In the basic exemplar depiction shown in the drawings, container 100 is connected to truck chassis 22 and by a system of attachment hooks 94, 95 and 96, known in the art. Rail members 24 and 26 can, in turn be connected to truck chassis 22 by, for example, external hook and clasp 97, preferably located in two locations, both front and aft, on the rail members. Hydraulic or equivalent lift mechanism 102, connected to truck chassis 22 and rail members 24 and 26, is configured to raise and lower the rail members, along with guide rail 34 with ramp 40 stored between the rail members and suspended via carriage component 70.

Figure 3:
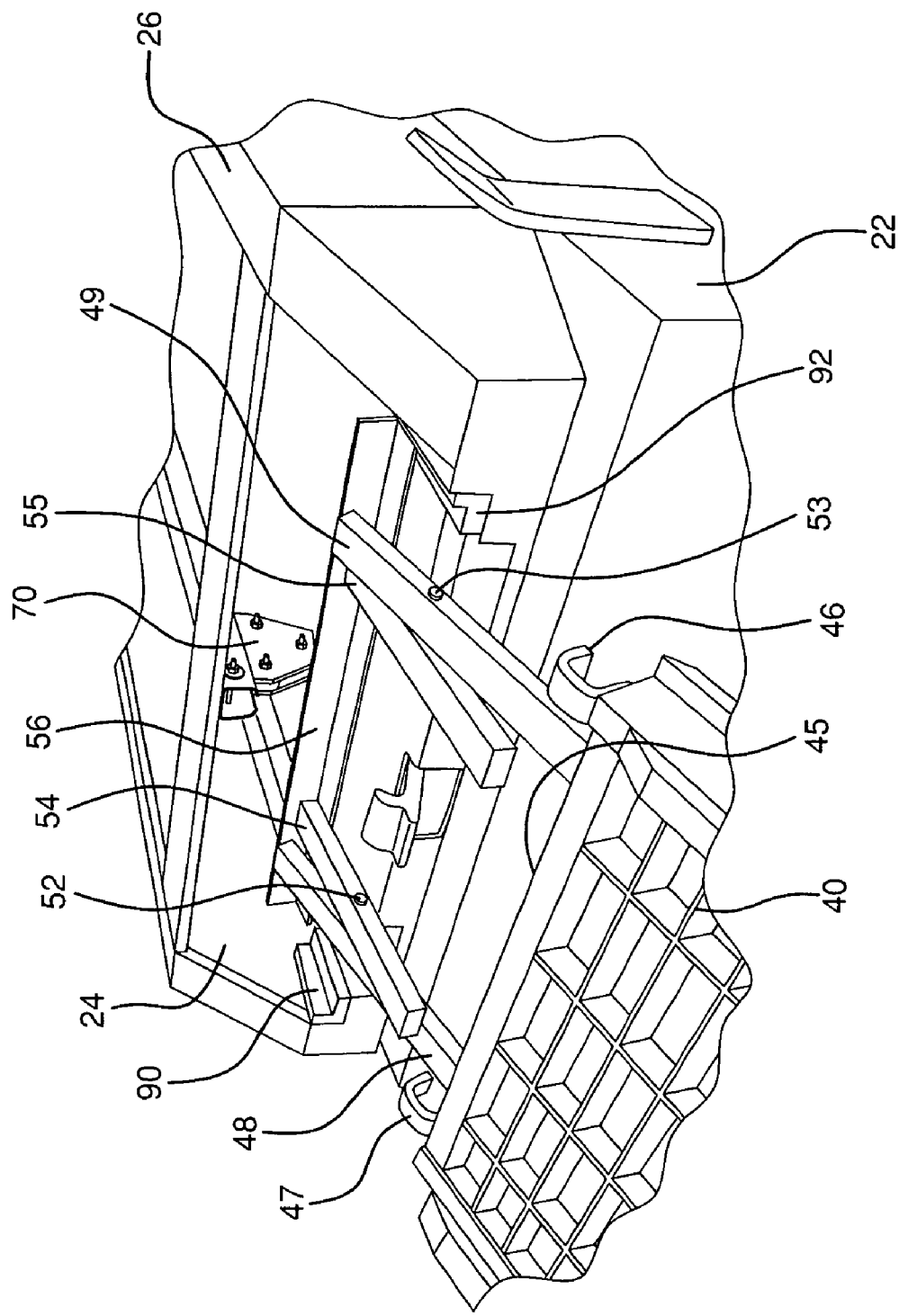
FIG. 3 is a partial isometric view of the upper end ramp connection of the system of the present invention.

When it is desired to use ramp 40 for off or on loading container 100 when it is on truck chassis 22, lower end 42 of the ramp is simply pulled out from between rail members 24 and 26 and away from the truck chassis. As ramp 40 is pulled, ramp support element 80 of carriage component 70 slides rearward, within channel 36 of guide rail 34, until it contacts guard rail stop bolt 39. At this point, ramp 40 is completely free of truck chassis 22, see FIGS. 3 and 8; and, via pivotable connections 50/51, 52/53, 59/61 and 60/62, the ramp can be pivoted down such that its lower end 42 is placed on the ground and hooks 46 and 47 can be inserted into corresponding openings in bumper 103 of container 100. Ramp 40 is ready for use.

When ramp 40 is to be stowed and stored, pivotable connections 50/51, 52/53, 59/61, and 60/62 allow the ramp to be raised parallel to the ground, once end 42 is lifted up. Ramp 40 is then pushed toward truck chassis 22, to be repositioned between rail members 24 and 26. This causes ramp support element 80 of carriage component 70 to slide forward within channel 36 of guide rail 34. Storage of ramp 40 is completed when ramp cross member 56 contacts forward truck chassis bulkhead 38. Ramp 40 is thus returned to its resting, storage position between and parallel to rail members 24 and 26, and suspended above well 27 and system components 29.

Figure 11:
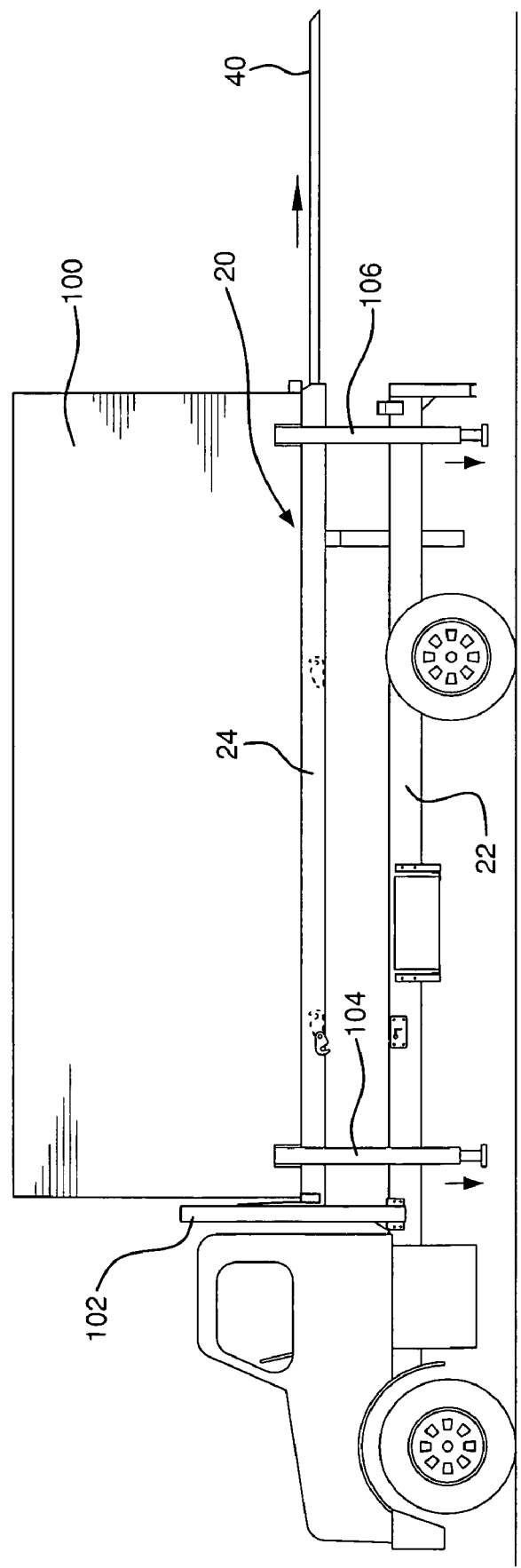
FIG. 11 is an elevation view of the ramp of the present invention being slid out for use with an elevated container.

The ramp system 20 of the present invention can also just as easily be used with an elevated container. As shown in FIG. 11, lift mechanism 102 vertically elevates ramp system 20, with guide rails 24 and 26 supporting container 100 thereon. When container 100 reaches the loading dock or other desired heights, its legs 104 and 106 are lowered to the ground. Ramp 40 can then be pulled but and hooked onto free-standing container 100 for loading/unloading operations.

By ramp system 20 of the present invention, a means is provided to a truck chassis for a self-contained ramp, positioned to be conveniently stored and then simply, quickly and efficiently retrieved from storage for ready loading and off loading of cargo containers. After a container located on the truck chassis is off/on loaded, ramp system 20 then permits easy, slideable movement of the ramp for continued storage within the truck chassis.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A retractable ramp system for use with a cargo-carrying container and for placement on or over a truck chassis of given length having operable hydraulic, electrical, and mechanical system components, said ramp system comprising:
   lateral rail members being substantially the same length as the truck chassis and container, said rail members being free from any connection or attachment to the container and being vertically moveable as part of the ramp system and independent of the container between a resting position on the truck chassis and an elevated position over the truck chassis;
   an elongated ramp having two ends and carriage means connected to one of the ends of the ramp for slideably transporting the ramp between the rail members and, when the rail members are in the resting position, for hanging the ramp in position over the truck chassis and for slideably transporting the ramp above the hydraulic, electrical, and mechanical system components of the truck chassis; and
   guide means located parallel to and between the rail members for slideably suspending the carriage means from the guide means, the guide means being free from any connection or attachment to the container but being fixedly mounted as part of the ramp system, whereby by the slideable movement of the carriage means within the guide means, the ramp is slideably transportable between a horizontal storage mode wherein the ramp is not supported by the container, is located between the rail members, and is supported solely by and within the ramp system, and, when the rail members are in the resting position above the truck chassis system components, to an angled use mode wherein the ramp extends from the container positioned on or above the truck chassis.

2. The ramp system as in claim 1 wherein the ramp is pivotably connected to the carriage means.

3. The ramp system as in claim 1 wherein the ramp is rotatable about four pairs of pivotable connections which pivot as the ramp transitions from the storage mode to the use mode.

4. The ramp system as in claim 1 wherein the guide means is substantially the same length as the length of the ramp.

5. The ramp system as in claim 1 wherein the guide means comprises a guide rail located between the rail members, said guide rail having a channel extending therethrough.

6. The ramp system as in claim 5 wherein the carriage means comprises an upstanding support element configured to be slideably moveable within the channel of the guide rail.

7. The ramp system as in claim 5 wherein the guide rail is substantially the same length as the length of the ramp.

8. The ramp system as in claim 1 wherein the carriage means comprises an upstanding support element configured to be slideably moveable within the guide means.

9. The ramp system as in claim 1 wherein guide means is located above the system components of the truck chassis when the rail members are in the resting position.

10. The ramp system as in claim 1 further comprising brace means extending between the rail members for fixedly mounting and supporting the guide means in position parallel to and between the rail members.

11. The ramp system as in claim 10 wherein the brace means comprises a plurality of cross beams secured to the guide means.

12. The ramp system as in claim 1 further comprising attachment means for removeably connecting the ramp to the container.

13. The ramp system as in claim 1 further comprising means connected to the truck chassis to vertically elevate the rail members, ramp, carriage means, and guide means as a single unit over the truck chassis.

14. A truck transport system comprising:
   a truck chassis of given length having operable hydraulic, electrical, and mechanical system components;
   a cargo carrying container configured to be transported on the truck chassis; and
   a retractable ramp system comprising:
      lateral rail members being substantially the same length as the truck chassis and container, said rail members being free from any connection or attachment to the container and being vertically moveable as part of the ramp system and independent of the container between a resting position on the truck chassis and an elevated position over the truck chassis;
      an elongated ramp having two ends and carriage means connected to one of the ends of the ramp for slideably transporting the ramp between the rail members and, when the rail members are in the resting position, for hanging the ramp in position over the truck chassis and for slideably transporting the ramp above the hydraulic, electrical, and mechanical system components of the truck chassis; and
      guide means located parallel to and between the rail members for slideably suspending the carriage means from the guide means, the guide means being free from any connection or attachment to the container but being fixedly mounted as part of the ramp system, whereby by the slideable movement of the carriage means within the guide means, the ramp is slideably transportable between a horizontal storage mode wherein the ramp is not supported by the container, is located between the rail members, and is supported solely by and within the ramp system, and, when the rail members are in the resting position, above the truck chassis system components, to an angled use mode wherein the ramp extends from the container positioned on or above the truck chassis.

15. The ramp system as in claim 14 wherein the ramp is pivotably connected to the carriage means.

16. The ramp system as in claim 14 wherein the ramp is rotatable about four pairs of pivotable connections which pivot as the ramp transitions from the storage mode to the use mode.

17. The ramp system as in claim 14 wherein the guide means is substantially the same length as the length of the ramp.

18. The ramp system as in claim 14 wherein the guide means comprises a guide rail located between the rail members, said guide rail having a channel extending therethrough.

19. The ramp system as in claim 18 wherein the carriage means comprises an upstanding support element configured to be slideably moveable within the channel of the guide rail.

20. The ramp system as in claim 18 wherein the guide rail is substantially the same length as the length of the ramp.

21. The ramp system as in claim 14 wherein the carriage means comprises an upstanding support element configured to be slideably moveable within the guide means.

22. The ramp system as in claim 14 wherein guide means is located above the system components of the truck chassis when the rail members are in the resting position.

23. The ramp system as in claim 14 further comprising brace means extending between the rail members for fixedly mounting and supporting the guide means in position parallel to and between the rail members.

24. The ramp system as in claim 23 wherein the brace means comprises a plurality of cross beams secured to the guide means.

25. The ramp system as in claim 14 further comprising attachment means for removeably connecting the ramp to the container.

26. The ramp system as in claim 1 further comprising means connected to the truck chassis to vertically elevate the rail members, ramp, carriage means, and guide means as a single unit over the truck chassis.

* * * * *